United States Patent [19]

Mitchell

[11] Patent Number: 5,094,323

[45] Date of Patent: Mar. 10, 1992

[54] BOOT PROTECTORS FOR DISC BRAKE CALIPER SUSPENSION

[75] Inventor: Clarence I. Mitchell, Xenia, Ohio

[73] Assignee: General Motors Corporation, Detroit, Mich.

[21] Appl. No.: 584,330

[22] Filed: Sep. 18, 1990

[51] Int. Cl.⁵ .............................................. F16D 55/00
[52] U.S. Cl. .............................. 188/73.31; 188/73.45; 277/212 FB
[58] Field of Search ................... 188/73.31, 73.45, 370; 277/212, 212 FB; 403/288, 337

[56] References Cited

U.S. PATENT DOCUMENTS

| | | | |
|---|---|---|---|
| 3,881,576 | 5/1975 | Harikawa et al. | 188/73.45 X |
| 4,428,461 | 1/1984 | Warwick | 188/73.31 X |
| 4,722,425 | 2/1988 | Weiler et al. | 188/73.45 |
| 4,854,423 | 8/1989 | Evans et al. | 188/73.45 X |

Primary Examiner—Robert J. Oberleitner
Assistant Examiner—Lee W. Young
Attorney, Agent, or Firm—Ernest E. Helms

[57] ABSTRACT

A sliding caliper disc brake assembly in which the caliper housing has apertures slidably receiving support pins in caliper mounting ears. The ears are provided with boot protectors which receive the support pins through one or more side wall apertures. The boot protectors fit closely to the caliper housing and to the support pins so that road dirt, water, chemicals and other debris are substantially prevented from entering the apertures formed in the caliper mounting ears. The boot protectors may also function as lubricant retainers so that lubricant retained therein may further protect the sliding surfaces.

4 Claims, 1 Drawing Sheet

U.S. Patent         Mar. 10, 1992         5,094,323
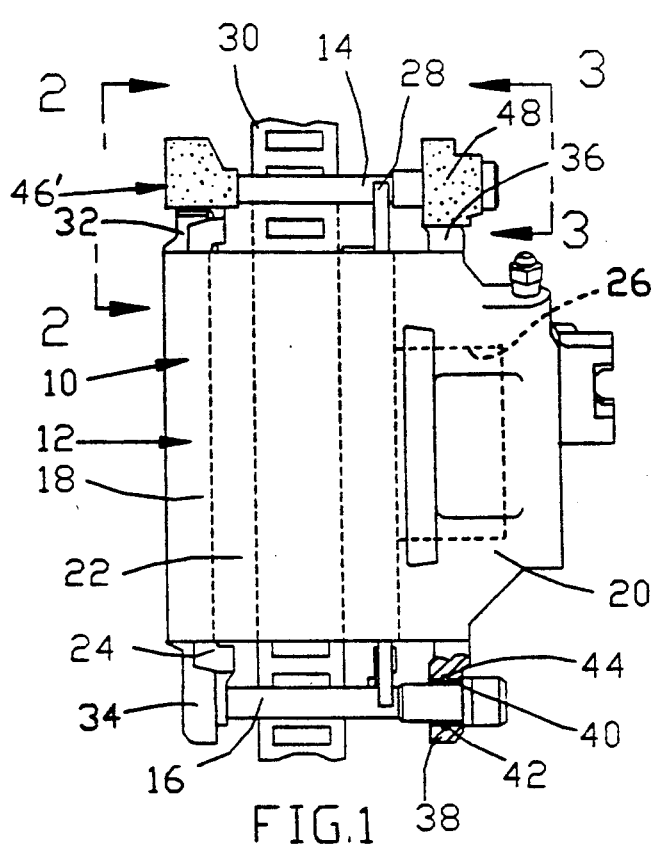
FIG.1
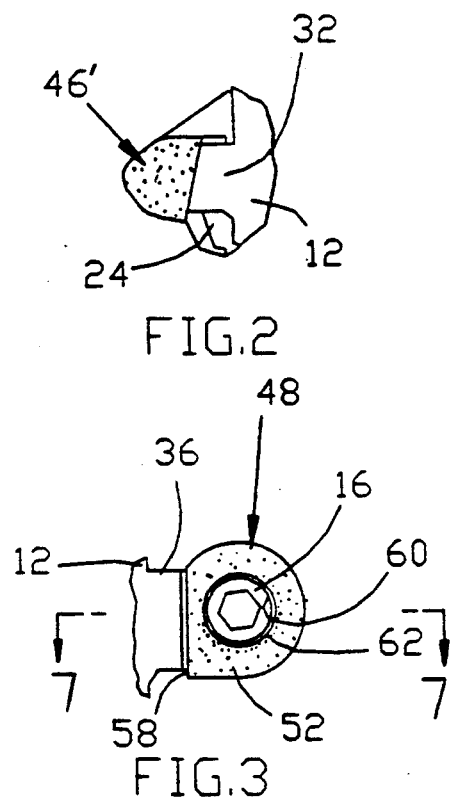
FIG.2
FIG.3
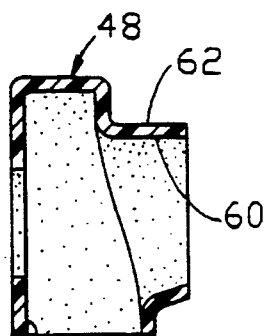
FIG. 7
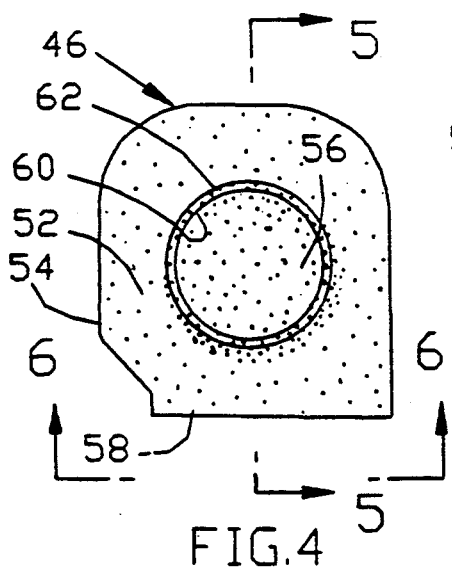
FIG.4
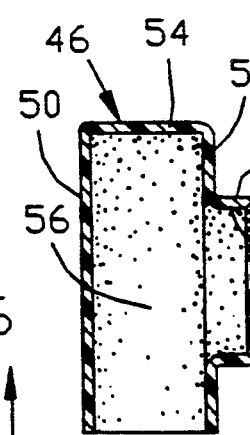
FIG.5
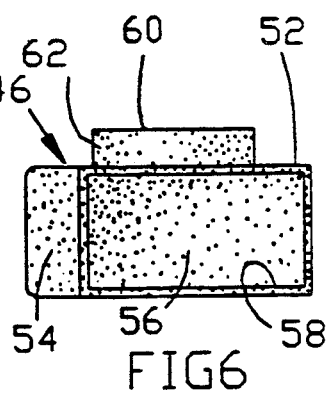
FIG.6

BOOT PROTECTORS FOR DISC BRAKE CALIPER SUSPENSION

FIELD OF THE INVENTION

The invention relates to sliding caliper disc brakes and more particularly to boot protectors for the sliding mechanisms supporting the caliper housing.

BACKGROUND OF THE INVENTION

Brakes of the sliding caliper disc brake type have been in use for many years. One of the most common types is disclosed in U.S. Pat. No. 3,628,639-Daley, Jr., issued Dec. 21, 1971. The type of caliper support mechanism shown in that patent has a fixed member provided with removable caliper mounting or support pins located to support the caliper housing at either end while the fixed member takes the brake torque reaction forces from the caliper housing. The support pins extend through ears or lugs formed on the caliper housing, commonly with two such ears or lugs at each end of that housing. The ears or lugs of each end are transversely bored in axial alignment so that the support pins fit into the transverse bores in sliding relation. It is common to provide rubber-like rings in internal grooves of the transverse bores to prevent metal-to-metal contact and unnecessary noise while permitting the caliper to slide transversely on the support pins as the brake is energized and deenergized.

As the brake shoes wear, these rubber-like rings slide on progressively moving limited areas on the outer surfaces of the support pins. While the rings are recessed in the transverse bores, they and the surfaces of the support pins within the bores are still subjected to damage from water, chemicals, dust and other debris from the roadway.

SUMMARY OF THE INVENTION

The invention herein disclosed and claimed resides in protective boots for at least some of the caliper housing ear or lug transverse bores so as to prevent or at least limit the entry of deleterious material into the transverse bores and onto the rubber-like support rings as well as the surfaces of the support pins on which those rings slide. Such a boot has a flexible plastic hollow body defined by generally parallel opposed spaced sides and a circumferential or band-like connective side connecting the opposed spaced sides throughout except for an opening in the connective side, all of the sides being so cooperatively arranged that they define a cavity for receiving the ear or lug through the opening in the connective side, with the ear transverse bore or opening and a portion of the support pin extending through and adjacent to the ear being within the cavity.

In one embodiment, one of the opposed spaced sides has an opening therethrough with a cylindrical extension of that side being formed about the opening and extending axially outwardly from that side. This opening and cylindrical extension or sleeve are adapted to receive the part of the support or mounting pin therethrough received in the caliper housing ear transverse bore. Where needed, it will also receive sufficient support pin outer surface area on either side of the caliper housing ear so as to protect the pin outer surface which is or will be in supporting engagement with the rubber-like ring or rings as the brake assembly is actuated and released throughout all stages of brake shoe wear. This support pin outer surface extends further axially as the brake shoes of the brake assembly are worn so that the caliper housing slides further along the outer surface areas of the support pins.

When there is no opening in the other opposed spaced side of the boot, the boot is particularly adapted for use on an ear in which the support pin is not capable of extending outwardly through the transverse bore of the ear. When the boot is to be used on an ear in which the support pin extends transversely well beyond the ear sides, then the other opposed spaced side may be similarly constructed by having a similar opening and a similar cylindrical extension or sleeve. In some instances this cylindrical extension or sleeve may be omitted. In either configuration, the body of the boot is in sufficient circumferential contact with the support pin at the opposed side openings and with the caliper housing at the base of the ear to prevent the entry of most of the water, chemicals and road debris that might otherwise enter the caliper ear transverse bore. The boot may be filled with a thick lubricant to further prevent debris from entering the transverse bores and to protect the sliding surfaces by the usual function of such lubricant.

BRIEF DESCRIPTION OF THE DRAWING

FIG. 1 is a plan view of a portion of a disc brake caliper assembly with protective boots embodying the invention installed on the inner and outer caliper housing ears at one of the caliper. None are shown on the housing ears at the other end of the caliper so that other structural arrangements are better shown. Parts are broken and in section.

FIG. 2 is a fragmentary side elevation view of one of the boots embodying the invention and installed on the caliper of FIG. 1, with parts broken away. The view is taken in the direction of arrows 2—2 of FIG. 1.

FIG. 3 is comparable to FIG. 2, but shows a modified version of the protective boot which is installed on another caliper ear through and beyond which the support pin extends. The view is taken in the direction of a 3—3 of FIG. 1.

FIG. 4 is a side elevation view which schematically illustrates a modified-shape protective boot similar to the one of the boots shown in the disc brake assembly of FIG. 1 through which the support pin does not co extend.

FIG. 5 is a cross section view of the boot of FIG. 4, taken in the direction of arrows 5—5 of that FIGURE.

FIG. 6 an end view of the boot of FIG. 4, taken in the direction of arrows 6—6 of that FIGURE. It clearly shows the opening in the connective side for receiving the ear into the boot cavity.

FIG. 7 is a view taken in the direction of arrows 7—7 of FIG. 3.

DETAILED DESCRIPTION

The brake caliper assembly 10 of FIG. 1 is somewhat schematically illustrated as a floating caliper disc brake. It includes a caliper housing 12 and support or mounting pins 14 and 16. These pins are mounted on a fixed member, not shown. The fixed member also takes the brake torque reaction forces exerted from the brake shoes to the caliber housing bridge section to the fixed member, as is well known in the art. The fixed member and the mounting arrangement may be as shown in the above-noted prior art patent.

The caliper housing has an outboard leg 18 and an inboard leg 20 joined by a caliper bridge section 22. The outboard brake shoe assembly 24 is mounted on the outboard leg 18. The inboard leg has the brake cylinder 26 formed in it, the exterior of which is shown. The inboard brake shoe assembly 28 is adjacent the inboard caliper leg, and is movable into friction braking engagement with the disc brake rotor 30 when the brake cylinder is actuated to move the piston in that cylinder toward the disc brake rotor. Actuation of the brake cylinder reacts on the caliper housing 12 to slide that housing rightwardly as seen in FIG. 1, moving the outboard brake shoe assembly 24 into friction braking engagement with the rotor 30.

The outboard leg 18 of the caliper housing 12 has oppositely extending ears or lugs 32 and 34 formed on it, and the inboard leg has similar oppositely extending ears or lugs 36 and 38 formed on it. The transverse bore 40 of ear 38 is more completely shown in the fragmentary cross section of that ear. The ears 32 and 36 are provided with similar transverse bores which are coaxially located, and ear 34 is provided with a similar transverse bore which is coaxially positioned with respect to transverse bore 40.

As the caliper housing moves during brake actuation, rightwardly as seen in FIG. 1, it slides on the support pins 14 and 16. This sliding action takes place between the inner periphery of the mounting rings contained in internal grooves in the transverse bores of the ears and the outer surfaces of the support pins. Mounting ring 42 is shown as being received in the internal groove 44 of ear 38. The other ears have similar grooves and mounting rings, with the mounting rings engaging the outer surfaces of the support or mounting pins 14 and 16 in sliding relation.

There is a slight but perceptible radial clearance between the walls defining the transverse bores and the outer surfaces of the mounting pins, as may be seen in ear 38 of FIG. 1 and in FIG. 3. This clearance is provided to permit most load and shock displacements of the caliper housing relative to the mounting pins without the caliper housing walls that define the transverse bores physically engaging the support pins. However, this clearance is also sufficient for water, chemicals, grains of dirt and dust and other road debris to enter into the transverse bores of the ears, damaging the mounting and in some instances inhibiting full stroke of the caliper housing during either brake actuation or release.

It is therefore desirable to provide a simple, inexpensive, easily installed sealing arrangement to protect the interiors of the transverse bores from receiving such debris. This is the objective of providing the boot protectors of the invention. The boots embodying the invention are preferably made of a flexible plastic material which does not react with the various lubricants and brake fluids used in and on the brake assembly. It may be quite flexible and rubber-like, or it may be somewhat harder but flexible material. However, it must be able to be fitted over the caliper housing ears, and preferably stretches a bit in this process and then recovers its shape after being placed in position. While boots may also be fitted over ears 34 and 38, none are shown over them in the drawing so that the relationship of the support pins to the ears are better illustrated.

Boot 46' is shown in FIG. 1 and boot 46 is shown in FIG. 4–6. It is associated with caliper housing ear 32, and another one like it may be associated with caliper housing ear 34. Boot 48 is shown in FIGS. 3 and 7. It is associated with caliper housing ear 36, and another one like it may be associated with caliper housing ear 38. In each of the types of boots 46' and 48, there are opposed spaced sides 50 and 52 connected by a circumferential, band-like side 54. These sides cooperate to form a boot cavity 56. An opening 58 is formed in boot side 54 through which a caliper housing ear is to be received. One of the boot opposed spaced sides, side 52 as shown in the drawing, has a boot first transverse opening 60 therethrough. A cylindrical extension 62 of boot side 52 is formed about boot first transverse opening 60 and extends outwardly from that side as a sleeve. Extension or sleeve 62 is adapted to receive a part of the mounting pin therethrough, as shown in FIGS. 1 and 3.

While boot 46 has the opening 60 only in its side 52, boot 48 has another such opening in its side 50 as well. Therefore support pin 14 extends through both of the opposed spaced sides of boos 48, as is clearly seen in FIG. 1. The opening through side 50 of boot 48 is illustrated as having no cylindrical extension or sleeve, but it may be provided with one similar to sleeve 62 if desired.

The boots are placed over the ears before the support pins are installed in place. Boot 46 is fitted over ear 32 and boot 48 is fitted over ear 36. Of course, should pin 14 be required to extend beyond the boot 46, a boot such as boot 48 would be fitted over ear 36 instead. The pins are then installed through the transverse bores of the ears by inserting them from the right as seen in FIG. 1 to the left, until the pins are secured in place to the fixed member which supports them. As the pins are so inserted, pin 14 extends through opening 60 of boot 48, through the transverse bore of ear 36, through the opening in side 50 of that boot comparable to its opening 60, through the opening 60 of boot 46, and then through the transverse bore of ear 32. Pin 16 is similarly inserted. During the insertion process, the pins are also secured to the fixed member, not shown. Ears 32 and 36 are then supported by pin 14 and ears 34 and 38 are then supported by pin 16.

The boots 46', 46 and 48 provide much better protection than does the brake structure without such boots. They are held in position, not only by their molded shape relative to the caliper housing ears, but also by the fact that they are in effect skewered on the support pins, each pin passing through one or both of the opposed spaced sides of each of the boots associated with it.

In some instances, it has been found to be desirable to insert a heavy lubricant into the boots so that the mounting rings-to-bolt surfaces are always lubricated and readily slidable. When so inserted, the lubricant also assists in preventing road debris from entering the transverse bores of the ears. The boots will help retain such lubricant as well as prevent much of the road debris from entering and contaminating the relatively slidable mounting surfaces of the caliper housing.

I claim:

1. In a disc brake caliper assembly having a sliding caliper body slidably mounted on one or more mounting pins extending through ears which project from the caliper body and provide openings for the pins, each of the ear openings having a resilient ring therein through which a mounting pin extends and in which the exterior surface of the mounting pin located therein is in axially slidable relation to the caliper housing via that ring to provide adjusted caliper housing positions as the brake shoe linings wear, the improvement comprising:

a protective boot for a caliper assembly ear opening and a portion of the mounting pin slidably engageable with the resilient ring in the ear opening, said boot comprising:

a flexible plastic hollow body having opposed spaced sides and a band-like side connecting said opposed spaced sides, said sides cooperatively defining a cavity for receiving the ear including the ear opening and the portion of the mounting pin extending through and adjacent to the ear in which the ear opening is formed, at least one of said opening opposed spaced sides having a boot first opening therethrough, a cylindrical extension of said at least one side formed about said boot first opening and extending outwardly from said at least one side as a sleeve and adapted to receive a part of the mounting pin therethrough, and said band-like side having therein a boot second opening through which the caliper assembly ear is adapted to extend so as to be received in said cavity with one end of the mounting pin extending through said boot first opening, the portion of said protective boot body adjacent said boot first and second openings being adapted respectively to engage the mounting pin immediately adjacent the ear opening and to engage the caliper housing at the base of the ear so that water and other road debris are substantially prevented from entering said boot cavity, and therefore protecting said ear opening and the outer surfaces of the mounting pin that are within said boot cavity.

2. The invention of claim 1 in which said protective boot has each of said opposed spaced sides thereof provided with an opening therethrough, one of which is said boot first opening and another of which is a boot third opening in axial alignment with said boot first opening, so that when said boot is placed over one ear and said mounting pin is then inserted through the one ear opening as well as said boot first and third openings in said opposed spaced sides of said boot, both of said first and third openings then engage the outer surface of the mounting pin extending therethrough in protective relation, said boot then preventing the entry of water and debris into the ear opening and also protecting the outer surface of the mounting pin on which the resilient ring slides as said disc brake caliper assembly is actuated and released throughout the life of the brake shoes forming a part of the caliper assembly.

3. The invention of claim 1 in which said protective boot has only one of said opposed spaced sides thereof provided with said first opening therethrough, the other one of said opposed spaced sides being adapted to fit over one end of the mounting pin in the ear, and said boot first opening engaging the outer surface of the mounting pin, said boot then preventing the entry of water and debris into the ear opening and also protecting the outer surface of the mounting pin on which said resilient ring slides as said disc brake caliper assembly is actuated and released throughout the life of the brake shoes forming a part of the caliper assembly.

4. The invention of claim 1 in which said protective boot is substantially filled with lubricant after being installed on a caliper ear and having a mounting pin extending therein so that said boot retains lubricant within the ear openings to further protect the slidable surfaces therein against contamination.

* * * * *